US008989913B2

(12) United States Patent
Tsunekawa

(10) Patent No.: US 8,989,913 B2
(45) Date of Patent: Mar. 24, 2015

(54) TRAVEL ROUTE ESTIMATION DEVICE AND TRAVEL ROUTE ESTIMATION METHOD USED IN THE SAME DEVICE

(75) Inventor: Jun Tsunekawa, Nagoya (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 3 days.

(21) Appl. No.: 13/130,851

(22) PCT Filed: Dec. 26, 2008

(86) PCT No.: PCT/JP2008/003995
§ 371 (c)(1),
(2), (4) Date: May 24, 2011

(87) PCT Pub. No.: WO2010/073300
PCT Pub. Date: Jul. 1, 2010

(65) Prior Publication Data
US 2011/0264302 A1 Oct. 27, 2011

(51) Int. Cl.
*G06F 7/00* (2006.01)
*B60W 40/06* (2012.01)
(Continued)

(52) U.S. Cl.
CPC ......... *B60W 40/076* (2013.01); *B60W 30/0953* (2013.01); *B60W 40/072* (2013.01);
(Continued)

(58) Field of Classification Search
CPC . G06F 7/00; B60W 40/06; B60W 2050/0051; B60W 40/072; B60W 2520/14; B60W 40/076; B60W 30/0953; B60W 2050/0052; B60W 2520/10
USPC .......................................................... 701/1
See application file for complete search history.

(56) References Cited

U.S. PATENT DOCUMENTS 4,700,960 A * 10/1987 Miki et al. ..................... 180/414
5,233,527 A * 8/1993 Shinnosuke .................... 701/28
(Continued)

FOREIGN PATENT DOCUMENTS

JP          7 262499      10/1995
JP         2001 319299    11/2001
(Continued)

OTHER PUBLICATIONS

International Search Report issued Apr. 7, 2009 in PCT/JP08/003995 filed Dec. 26, 2008.
(Continued)

*Primary Examiner* — John R Olszewski
*Assistant Examiner* — Jean-Paul Cass
(74) *Attorney, Agent, or Firm* — Oblon, McClelland, Maier & Neustadt, L.L.P.

(57) ABSTRACT

Provided is a travel route estimation device capable of accurately estimating, without excessively increasing communication load of the device, a shape of a travel route even when one's own-vehicle is traveling on a travel route that does not have any objects installed on the route. A calculation section calculates and successively stores a radius of curvature of the travel route based on a yaw rate detected by a yaw rate detection section and on a traveling velocity detected by a velocity detection section. When conducting a filtering process for reducing variation of the calculate radius of curvature, the calculation section selects a filtering constant for multiplying the stored radius of curvature in accordance with the type of the travel route of the own-vehicle, and generates information representing a radius of curvature obtained by conducting at least one filtering process by using the selected filtering constant.

8 Claims, 4 Drawing Sheets

(51) Int. Cl.
*B60W 40/076* (2012.01)
*B60W 40/072* (2012.01)
*B60W 30/095* (2012.01)
*B60W 50/00* (2006.01)

(52) U.S. Cl.
CPC .................. *B60W2050/0051* (2013.01); *B60W 2050/0052* (2013.01); *B60W 2520/10* (2013.01); *B60W 2520/14* (2013.01)
USPC .......................................................... 701/1

(56) References Cited

U.S. PATENT DOCUMENTS

| | | | |
|---|---|---|---|
| 5,350,912 A * | 9/1994 | Ishida | 250/202 |
| 5,446,657 A * | 8/1995 | Ikeda et al. | 701/41 |
| 5,467,283 A | 11/1995 | Butsuen et al. | 701/301 |
| 5,612,699 A * | 3/1997 | Yamada | 342/70 |
| 6,269,308 B1 | 7/2001 | Kodaka et al. | 701/301 |
| 6,718,259 B1 * | 4/2004 | Khosla | 701/536 |
| 6,795,765 B2 * | 9/2004 | Miyahara | 701/96 |
| 6,823,245 B2 * | 11/2004 | Sugitani et al. | 701/32.9 |
| 7,027,966 B2 * | 4/2006 | Klauder, Jr. | 702/2 |
| 7,034,742 B2 * | 4/2006 | Cong et al. | 342/70 |
| 7,209,930 B2 * | 4/2007 | Maeda et al. | 1/1 |
| 7,447,577 B2 * | 11/2008 | Hattori et al. | 701/41 |
| 7,522,091 B2 * | 4/2009 | Cong et al. | 342/70 |
| 7,626,533 B2 * | 12/2009 | Cong et al. | 342/70 |
| 7,639,841 B2 * | 12/2009 | Zhu et al. | 382/104 |
| 7,715,967 B2 * | 5/2010 | Kim et al. | 701/53 |
| 7,739,003 B2 * | 6/2010 | Johnson | 701/4 |
| 7,884,754 B1 * | 2/2011 | Alouani et al. | 342/95 |
| 7,911,374 B2 * | 3/2011 | Moriuchi et al. | 342/70 |
| 7,920,087 B2 * | 4/2011 | Ogawa | 342/70 |
| 8,055,445 B2 * | 11/2011 | Schiffmann et al. | 701/301 |
| 8,065,084 B2 * | 11/2011 | Urban et al. | 701/301 |
| 8,082,101 B2 * | 12/2011 | Stein et al. | 701/301 |
| 8,086,372 B2 * | 12/2011 | Okuda et al. | 701/41 |
| 8,102,308 B2 * | 1/2012 | Tsunekawa | 342/107 |
| 8,154,437 B2 * | 4/2012 | Tsunekawa | 342/107 |
| 8,155,807 B2 * | 4/2012 | Doria et al. | 701/17 |
| 8,195,360 B2 * | 6/2012 | Nakadori et al. | 701/36 |
| 8,285,764 B2 * | 10/2012 | Moriya | 708/200 |
| 8,311,706 B2 * | 11/2012 | Lu et al. | 701/38 |
| 8,352,143 B2 * | 1/2013 | Lu et al. | 701/70 |
| 8,442,720 B2 * | 5/2013 | Lu et al. | 701/38 |
| 2001/0016798 A1 * | 8/2001 | Kodaka et al. | 701/301 |
| 2001/0053955 A1 * | 12/2001 | Shirai et al. | 701/200 |
| 2002/0022927 A1 * | 2/2002 | Lemelson et al. | 701/301 |
| 2002/0042668 A1 * | 4/2002 | Shirato et al. | 701/1 |
| 2002/0044080 A1 * | 4/2002 | Shirai et al. | 342/70 |
| 2002/0049539 A1 * | 4/2002 | Russell et al. | 701/301 |
| 2002/0138192 A1 * | 9/2002 | Lueder et al. | 701/93 |
| 2003/0004777 A1 * | 1/2003 | Phillips | 705/10 |
| 2003/0100992 A1 * | 5/2003 | Khosla | 701/200 |
| 2004/0024498 A1 * | 2/2004 | Okamura et al. | 701/1 |
| 2004/0143416 A1 * | 7/2004 | Hattori et al. | 702/157 |
| 2005/0179580 A1 * | 8/2005 | Cong et al. | 342/70 |
| 2005/0240334 A1 * | 10/2005 | Matsumoto et al. | 701/93 |
| 2005/0246091 A1 * | 11/2005 | Kuroda et al. | 701/200 |
| 2005/0267661 A1 * | 12/2005 | Iwazaki et al. | 701/41 |
| 2006/0006021 A1 * | 1/2006 | Takimoto et al. | 180/446 |
| 2009/0144331 A1 * | 6/2009 | Witmer | 707/104.1 |
| 2009/0212993 A1 * | 8/2009 | Tsunekawa et al. | 342/71 |
| 2011/0246071 A1 * | 10/2011 | Tsunekawa | 701/301 |
| 2012/0316921 A1 * | 12/2012 | Carsanaro et al. | 705/7.32 |
| 2013/0204665 A1 * | 8/2013 | Carsanaro et al. | 705/7.32 |

FOREIGN PATENT DOCUMENTS

| | | |
|---|---|---|
| JP | 2001 328451 | 11/2001 |
| JP | 2004 217178 | 8/2004 |
| JP | 2005 140749 | 6/2005 |
| JP | 2008 49828 | 3/2008 |
| JP | 2008 74401 | 4/2008 |

OTHER PUBLICATIONS

International Preliminary Report on Patentability issued Jun. 10, 2010 in PCT/JP08/003995 filed Dec. 26, 2008 (with English translation).

* cited by examiner

TRAVEL ROUTE ESTIMATION DEVICE AND TRAVEL ROUTE ESTIMATION METHOD USED IN THE SAME DEVICE

TECHNICAL FIELD

The present invention relates to a travel route estimation device, and more specifically, relates to a travel route estimation device mounted on a movable body such as an automobile.

BACKGROUND ART

In recent years, in order to conduct an inter-vehicular distance maintenance control and the like, a device that estimates a radius of curvature of a travel route of one's own vehicle is mounted on a vehicle. As methods for estimating the radius of curvature of the travel route of the own-vehicle, there are two methods which will be described next.

A first method is a method that estimates the radius of curvature of the travel route of the own-vehicle based on such as a relative position and a relative velocity, which are measured by a distance/angle measuring instrument mounted on the own-vehicle, of a standstill object (for example, an object installed on the route such as a reflector) existing on the travel route of the own-vehicle. With the first method, a radius of curvature with fine accuracy can be estimated without generating steady error as described later. However, with the first method, time is required for recognizing a behavior of the standstill object. Therefore, with the first method, in cases such as when a change of the radius of curvature of the travel route of the own-vehicle is sharp, time is required for precisely estimating the radius of curvature, thus resulting in an inferior responsivity.

A second method is a method that estimates the radius of curvature of the travel route of the own-vehicle based on a steering angle or a yaw rate of the own-vehicle. With the second method, a responsivity that is better than the above described first method is obtained since the radius of curvature is directly estimated based on the steering angle and the yaw rate of the own-vehicle. However, with the second method, steady error in the estimate radius of curvature is generated since a zero point of a sensor for detecting the steering angle or the yaw rate changes depending on the degree of cant of a road.

Therefore, for example, in a travel route estimation device disclosed in patent literature 1 (hereinafter, referred to as a conventional technology), in order to estimate the radius of curvature with a relatively fine accuracy in an ordinary state of traveling and with a relatively fine responsivity even when traveling on a travel route with a sharp radius-of-curvature, a radius of curvature is estimated by averaging a first radius of curvature estimated by the first method and a second radius of curvature estimated by the second method.

[Patent Literature 1] Japanese Laid-Open Patent Publication No. 2001-328451

DISCLOSURE OF THE INVENTION

Problems to be Solved by the Invention

However, the conventional technology described above has a problem that is described next. Namely, with the conventional technology, the first radius of curvature using the first method described above cannot be estimated unless a standstill object exists on the travel route of the own-vehicle. Furthermore, with the conventional technology, it is necessary to transmit and receive information such as the relative position and the relative velocity, which are measured by the distance/angle measuring instrument and which are necessary for estimating the first radius of curvature for the first method, to the standstill object, thereby load of communication for the device becomes large.

Therefore, an objective of the present invention is to provide a travel route estimation device capable of accurately estimating a shape of a travel route without increasing load of communication for the device, even when one's own-vehicle is traveling on a travel route without any standstill objects.

Solution to the Problems

In order to solve the above described problem, the present invention includes the characteristics indicated in the following.

A first aspect of the present invention is a travel route estimation device including: displacement velocity detection means for detecting a displacement velocity of one's own-vehicle over a travel route surface; first estimation means for estimating, based on the displacement velocity, a first numerical value representing a shape of a travel route of the own-vehicle; second estimation means for estimating a second numerical value representing a shape of the travel route of the own-vehicle, by conducting a filtering process on the first numerical value, which is estimated by the first estimation means, using at least either one of at least two predetermined filtering constants which are mutually different from one another; and generation means for generating information representing the second value estimated by the second estimation means.

In a second aspect of the present invention based on the first aspect, the second estimation means includes: filtering process means for calculating, based on the displacement velocity and by using each of the two filtering constants, two third-numerical values by conducting a filtering process on each of the first numerical values; weighted average means for calculating and estimating the second numerical value by obtaining a weighted average using each of the two third-numerical values calculated by the filtering process means; and weight control means for gradually increasing or decreasing, based on the two third-numerical values calculated by the filtering process means, each weight of the two third-numerical values for the weighted average means in order to obtain the weighted average.

In a third aspect of the present invention based on the first aspect, the second estimation means includes: selection means for selecting, based on the displacement velocity, a filtering constant among the at least two predetermined filtering constants in order to calculate the second numerical value; and filtering process means for calculating and estimating the second numerical value, by conducting a filtering process on the first numerical value estimated by the first estimation means by using the filtering constant selected by the selection means.

In a fourth aspect of the present invention based on the second aspect, as the filtering process, the filtering process means calculates the respective third-numerical values for the two filtering constants, by conducting, for each of the two filtering constants, a calculation of multiplying the filtering constants respectively to a latest estimate of the first numerical value and a previous estimate of the first numerical value, which are estimated by the first estimation means, and adding products of those.

In a fifth aspect of the present invention based on the third aspect, as the filtering process, the filtering process means multiplies the filtering constants respectively to a latest estimate of the first numerical value and a previous estimate of the first numerical value, which are estimated by the first estimation means, and adds products of those.

In a sixth aspect of the present invention based on the first aspect, the displacement velocity detection means detects, as the displacement velocity, both a traveling velocity of the own-vehicle and a rotational angular velocity of the own-vehicle over the travel route surface.

In a seventh aspect of the present invention based on the first aspect, the first estimation means estimates, as the first numerical value, a radius of curvature of the travel route of the own-vehicle, and the second estimation means estimates, as the second numerical value, a radius of curvature of the travel route of the own-vehicle.

In an eighth aspect of the present invention based on the seventh aspect, the generation means generates the information for a device that determines, by using the radius of curvature estimated as the second numerical value as a prediction result of a traveling direction of the own-vehicle, whether or not the own-vehicle and another vehicle will collide.

A ninth aspect of the present invention, is a travel route estimation method including: a displacement velocity detection step of detecting a displacement velocity of one's own-vehicle over a travel route surface; a first estimation step of estimating, based on the displacement velocity, a first numerical value representing a shape of a travel route of the own-vehicle; a second estimation step of estimating a second numerical value representing a shape of the travel route on the own-vehicle, by conducting a filtering process on the first numerical value, which is estimated at the first estimation step, using at least either one of two predetermined filtering constants which are mutually different from one another; and a generation step of generating information representing the second value estimated at the second estimation step.

Advantageous Effects of the Invention

The first aspect allows to accurately estimate a shape of a travel route without increasing load of communication even when one's own-vehicle is traveling on a travel route without having any standstill objects installed, since a numerical value representing a shape of the travel route of the own-vehicle is estimated based on a displacement velocity of the own-vehicle over a travel route surface.

The second aspect allows to prevent a numerical value represented by information generated by a generation means from largely changing instantaneously, since a weighted average is obtained for numerical values representing shapes of two travel routes calculated by the filtering process means, and furthermore, weights are gradually increased or decreased based on each of the numerical values.

The third aspect allows to calculate and estimate the second numerical value, by selecting, in order to calculate the second numerical value based on the first numerical value, a filtering constant in advance based on the displacement velocity of the own-vehicle, and by conducting a filtering process on the first numerical value by using the selected filtering constant.

The fourth aspect allows to conduct, on each of the two filtering constants, a filtering process of performing a calculation of multiplying filtering constants respectively to the first numerical value and a previous estimate of the first numerical value, and adding the products of those; and to calculate, by the filtering process, the third numerical values for each of the filtering constants.

The fifth aspect allows to calculate and estimate the second numerical value, by multiplying the filtering constant selected by the selection means to the first numerical value and a previous estimate of the first numerical value, and by adding the products of those.

The sixth aspect allows to detect, as the displacement velocity, both a traveling velocity of the own-vehicle and a rotational angular velocity of the own-vehicle over the travel route surface, and to estimate the second numerical value based on the detected traveling velocity and rotational angular velocity.

The seventh aspect allows to estimate the second numerical value, based on the radius of curvature which is of the travel route of the own-vehicle and which is estimated as a numerical value representing the shape of the travel route.

The eighth aspect allows the generation means to generate the information representing the second numerical value for a device that determines whether or not the own-vehicle and another vehicle will collide.

Furthermore, a travel route estimation method of the present invention allows achieving an advantageous effect similar to that of the first aspect described above.

DESCRIPTION OF THE REFERENCE CHARACTERS

1 travel route estimation device
101 yaw rate detection section
102 velocity detection section
103 calculation section Best Mode For Carrying Out the Invention (First Embodiment)

Figure 1:
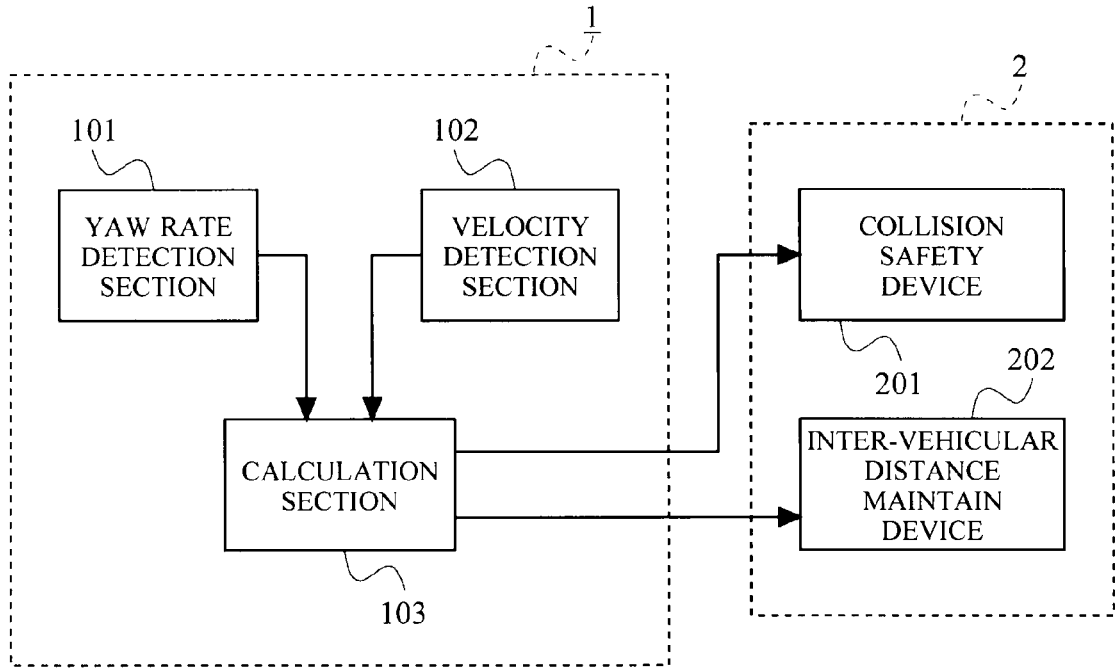
FIG. 1 is a block diagram showing an outlined configuration of a travel route estimation device according to the present invention.

FIG. 1 is a block diagram showing an outlined configuration of a travel route estimation device 1 of a first embodiment of the present invention. The travel route estimation device 1 includes a yaw rate detection section 101, a velocity detection section 102, and a calculation section 103. In the descriptions of the present embodiment, a case where the travel route estimation device 1 is mounted on one's own-vehicle is described as one example.

Representatively, the yaw rate detection section 101 is a sensor such as a gyro sensor which can detect an angle of rotation; and when the own-vehicle is rotated about an axis that passes through the center of gravity of the own-vehicle in the vertical direction, the yaw rate detection section 101 successively detects, as a rotational angular velocity (yaw rate), a displacement velocity of an angle of rotation (yaw angle)

toward a rotation direction among directions over a travel route surface of the own-vehicle. Every time the rotational angular velocity is detected, the yaw rate detection section 101 generates rotational angular velocity information representing the detected rotational angular velocity.

Among the directions over the travel route surface of the own-vehicle, the velocity detection section 102 successively detects a displacement velocity in a traveling direction of the own-vehicle as a traveling velocity. Every time a traveling velocity is detected, the velocity detection section 102 generates traveling velocity information representing the detected traveling velocity.

Representatively, the calculation section 103 is an ECU (Electric Control Unit) mainly including electronic parts such as an integrated circuit; and when the rotational angular velocity information is generated by the yaw rate detection section 101, the calculation section 103 acquires the generated rotational angular velocity information, and when the traveling velocity information is generated by the velocity detection section 102, the calculation section 103 acquires the generated traveling velocity information.

Figure 2:
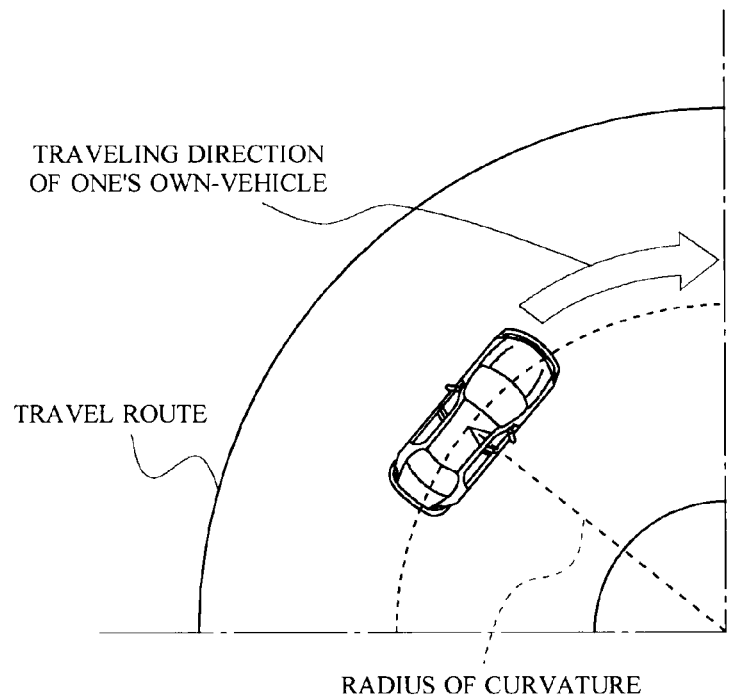
FIG. 2 is a figure showing one example of a radius of curvature of the travel route.

FIG. 2 is a figure showing one example of a numerical value representing a shape of the own-vehicle's travel route estimated by the calculation section 103 of the present embodiment based on the rotational angular velocity information and the traveling velocity information. FIG. 2 shows a radius of curvature of the travel route of the own-vehicle as one example of the numerical value representing the shape of the travel route of the own-vehicle. When the calculation section 103 acquires the rotational angular velocity information and the traveling velocity information, the calculation section 103 estimates a radius of curvature of the travel route in which the own-vehicle is traveling as shown in FIG. 2 as one example, based on the rotational angular velocity and on the traveling velocity, which are respectively represented by the acquired rotational angular velocity information and traveling velocity information.

The radius of curvature of the travel route in which the own-vehicle is traveling can be calculated and estimated using numerical formula (1) shown in the following.

$$R = \frac{v}{y} \quad (1)$$

Here, in the numerical formula (1), R is radius of curvature, v is traveling velocity of one's own-vehicle, and y is rotational angular velocity. Every time a unit of time (for example, one second) elapses, the calculation section 103 estimates, as a radius of curvature of the travel route in which the own-vehicle is traveling, a radius of curvature R which is calculated by using the numerical formula (1) based on the rotational angular velocity and traveling velocity represented by the rotational angular velocity information and traveling velocity information which are acquired respectively. Every time a radius of curvature is estimated, the calculation section 103 successively stores the estimated radius-of-curvature in a storage section which is not shown.

However, the rotational angular velocity detected by the yaw rate detection section 101 and the traveling velocity detected by the velocity detection section 102 both vary. Thus, the radius of curvature R, which is obtained by the calculation section 103 with the numerical formula (1) by directly applying both the rotational angular velocity represented by the rotational angular velocity information and the traveling velocity represented by the traveling velocity information, also varies. Therefore, by using a publicly known method, the calculation section 103 conducts a filtering process on the radius of curvature R obtained with the numerical formula (1). One example of the method used by the calculation section 103 for the filtering process is a calculation method of multiplying filtering constants respectively to, among radius of curvatures R successively stored by the calculation section 103, the radius of curvatures R used in the filtering processes, up to a stored radius of curvature R preceding a latest radius of curvature R by a predetermined number, and adding the products of those. Every time the latest radius of curvature R is stored, the calculation section 103 estimates and successively stores a calculated value obtained from the filtering process as an estimated radius-of-curvature, thereby allowing to reduce the variation of the radius of curvature R obtained by using the numerical formula (1).

The estimation result of the estimated radius-of-curvature changes by changing each of the filtering constants used for conducting the filtering processes using the above described method on the radius of curvatures R successively stored by the calculation section 103. More specifically, for example, if the filtering process is conducted by using a relatively large filtering constant for multiplying a radius of curvature R having a relatively short time period since being stored and by using a relatively small filtering constant for multiplying a radius of curvature R having a relatively long time period since being stored, among the radius of curvatures R successively stored by the calculation section 103; the radius of curvature R having the shorter time period since being stored is relatively highly reflected on the calculated estimated radius-of-curvature. Here, the filtering process, in which a filtering constant for multiplying the radius of curvature R having a relatively short time period since being stored is set to be relatively large and a filtering constant for multiplying the radius of curvature R having a relatively long time period since being stored is set to be relatively small, is, for example, a filtering process in which filtering constants are set to become sequentially smaller by having a filtering constant for multiplying the latest radius of curvature R to be the largest and a filtering constant for multiplying the oldest radius of curvature R to be the smallest, among the filtering constants that are each for multiplying a radius of curvature R used in a filtering process amongst the radius of curvatures R successively stored by the calculation section 103.

On the other hand, if the filtering process is conducted by using a relatively small filtering constant for multiplying the radius of curvature R having a relatively short time period since being stored and by using a relatively large filtering constant for multiplying the radius of curvature R having a relatively long time period since being recorded, among the radius of curvatures R successively stored by the calculation section 103; the radius of curvature R having the relatively long time period since being stored is relatively highly reflected on the calculated estimated radius-of-curvature. Here, the filtering process, in which a filtering constant for multiplying the radius of curvature R having the relatively short time period since being stored is set to be relatively small and a filtering constant for multiplying the radius of curvature R having the relatively long time period since being stored is set to be relatively large, is, for example, a filtering process in which filtering constants are set to be sequentially large by having a filtering constant for multiplying the latest radius of curvature R to be the smallest and a filtering constant for multiplying the oldest radius of curvature R to be the largest, among the filtering constants that are each for multiplying a radius of curvature R used in a filtering process amongst the radius of curvatures R successively stored by the calculation section 103.

Figure 3:
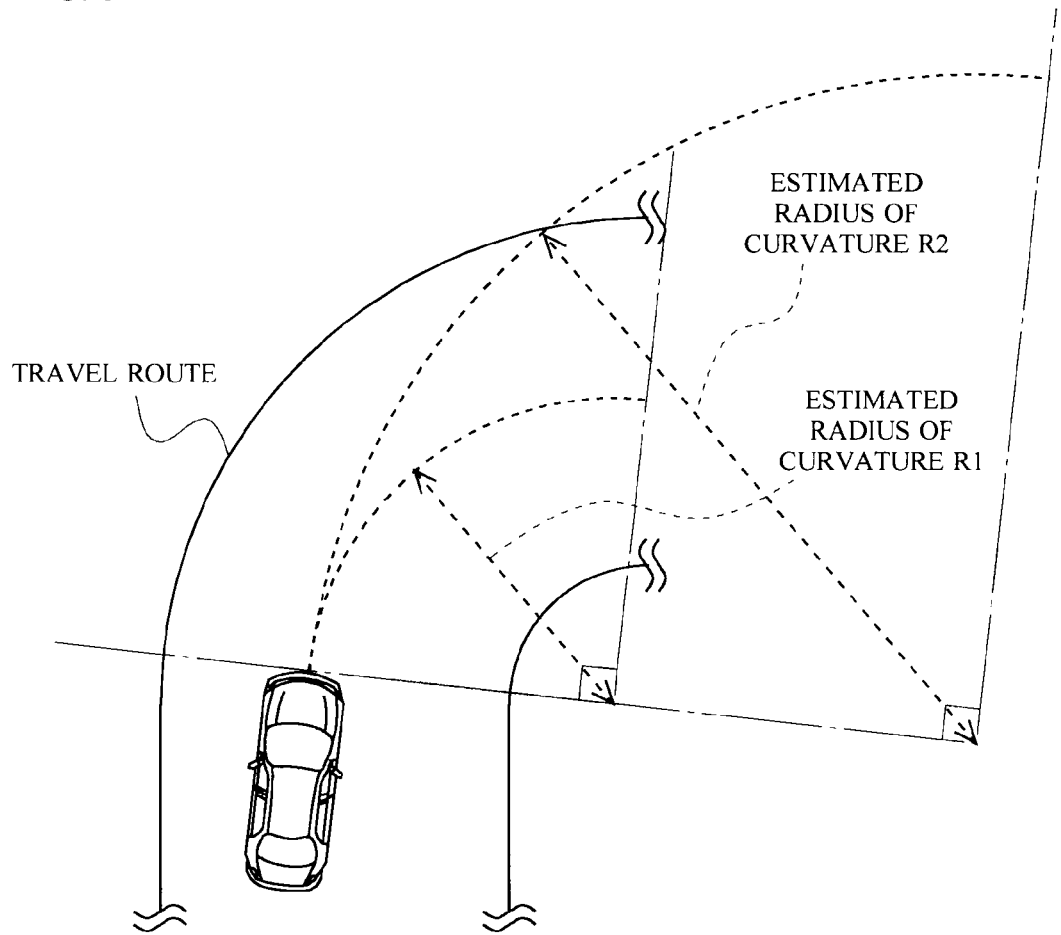
FIG. 3 is a figure showing one example of an estimation result of an estimated radius-of-curvature according to the present invention.

FIG. 3 a figure showing one specific example of an estimation result of an estimated radius-of-curvature which changes by changing the filtering constant. Envisioned here is a case where, the own-vehicle moves into an entrance of a curve from a straight route as shown in FIG. 3, and the rotational angular velocity of the own-vehicle is changed by having a driver steer the own-vehicle so as to travel along the curve and to change the traveling direction of the own-vehicle. In this situation, if the calculation section 103 conducts the filtering process by setting a relatively large filtering constant for multiplying the radius of curvature R having a relatively short time period since being stored and by setting a relatively small filtering constant for multiplying the radius of curvature R having a relatively long time period since being stored, a calculated estimated radius-of-curvature will be relatively small as it is the case with an estimated radius-of-curvature R1 shown in FIG. 3. On the other hand, if the calculation section 103 conducts the filtering process by setting a relatively small filtering constant for multiplying the radius of curvature R having a relatively short time period since being stored and by setting a relatively large filtering constant for multiplying the radius of curvature R having a relatively long time period since being stored, a calculated estimated radius-of-curvature will be relatively large as it is the case with an estimated radius-of-curvature R2 shown in FIG. 3.

The reason is because, when the own-vehicle is traveling on a straight route, the rotational angular velocity of the own-vehicle will be essentially zero, since the driver steers the own-vehicle such that the traveling direction of the own-vehicle essentially matches the direction of the straight route. On the other hand, when own-vehicle enters a curve from a straight route, the rotational angular velocity of the own-vehicle changes and becomes large, since the driver steers the own-vehicle such that the traveling direction of the own-vehicle essentially matches the direction of the curve. Furthermore, since the radius of curvature R is inversely proportional to the rotational angular velocity of the own-vehicle as indicated in the numerical formula (1), the radius of curvature R becomes relatively large when the own-vehicle is traveling on the straight route and when the rotational angular velocity of the own-vehicle is essentially zero, and becomes relatively small when the own-vehicle enters a curve from a straight route and when the rotational angular velocity of the own-vehicle changes and becomes large. More specifically, when the own-vehicle enters a curve from a straight route, the not-shown storage section of the calculation section 103 stores therein radius of curvatures that becomes sequentially smaller from the radius of curvature R having a relatively long time period since being stored to the radius of curvature R having a relatively short time period since being stored.

If the calculation section 103 conducts the filtering process by setting a relatively large filtering constant for multiplying the radius of curvature R having a relatively short time period since being stored, and by setting a relatively small filtering constant for multiplying the radius of curvature R having a relatively long time period since being stored, an estimated radius-of-curvature that is close to an actual radius of curvature of a travel route in which the own-vehicle is currently traveling is calculated, since the filtering constant for multiplying the radius of curvature R having a relatively short time period since being stored becomes large. Therefore, as shown in the example in FIG. 3, when the own-vehicle moves into an entrance of a curve from a straight route, if the calculation section 103 conducts the filtering process by setting a relatively large filtering constant for multiplying the radius of curvature R having a relatively short time period since being stored and by setting a relatively small filtering constant for multiplying the radius of curvature R having a relatively long time period since being stored, a relatively small estimated radius-of-curvature R1 is calculated.

On the other hand, if the calculation section 103 conducts the filtering process by setting a relatively small filtering constant for multiplying the radius of curvature R having a relatively short time period since being stored and by setting a relatively large filtering constant for multiplying the radius of curvature R having a relatively long time period since being stored, an estimated radius-of-curvature that is close to an actual radius of curvature R of a travel route in which a relatively long time has elapsed ever since the own-vehicle has been traveling in the travel route is calculated, since the filtering constant for multiplying the radius of curvature R having a relatively long time period since being stored becomes large. Therefore, as shown in FIG. 3, when the own-vehicle moves into an entrance of a curve from a straight route, if the calculation section 103 conducts the filtering process by setting a relatively small filtering constant for multiplying the radius of curvature R having a relatively short time period since being stored and by setting a relatively large filtering constant for multiplying the radius of curvature R having a relatively long time period since being stored, a relatively large estimated radius-of-curvature R2 is calculated.

Figure 4:
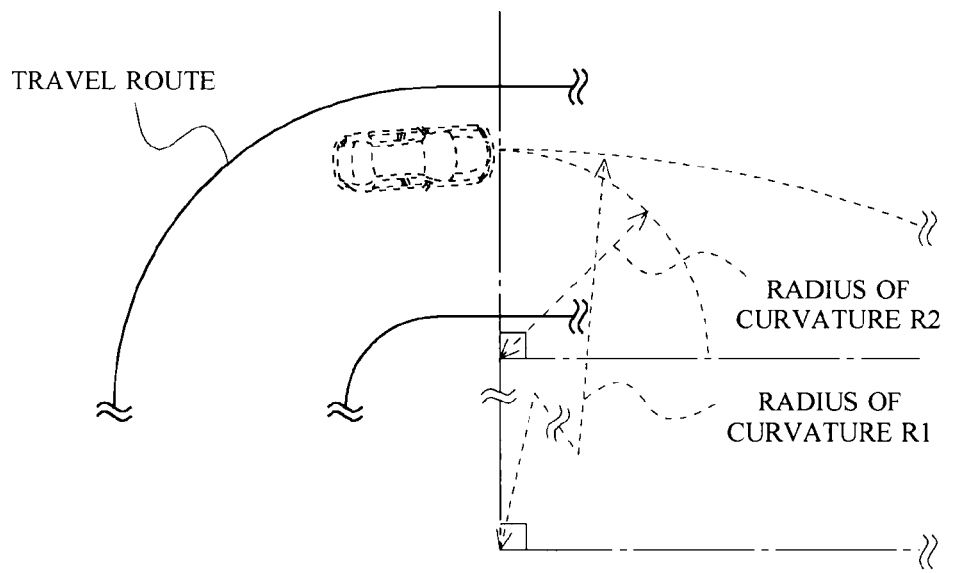
FIG. 4 is a figure showing one example of an estimation result of an estimated radius-of-curvature according to the present invention.

FIG. 4 is a figure showing another specific example of the estimation result of the estimated radius-of-curvature which changes by changing the filtering constant. Envisioned here is a case where, the own-vehicle enters a straight route from a curve as shown in FIG. 4, and the rotational angular velocity of the own-vehicle essentially stops changing by having the driver steer the own-vehicle in order to travel along the straight route so as to essentially match the traveling direction of the own-vehicle to a direction of the straight route. In this situation, if the calculation section 103 conducts the filtering process by setting a relatively large filtering constant for multiplying the radius of curvature R having a relatively short time period since being stored and by setting a relatively small filtering constant for multiplying the radius of curvature R having a relatively long time period since being stored, a calculated estimated radius-of-curvature will be relatively large as it is the case with an estimated radius-of-curvature R1 shown in FIG. 4. On the other hand, if the calculation section 103 conducts the filtering process by setting a relatively small filtering constant for multiplying the radius of curvature R having a relatively short time period since being stored and by setting a relatively large filtering constant for multiplying the radius of curvature R having a relatively long time period since being stored, a calculated estimated radius-of-curvature will be relatively small as it is the case with an estimated radius-of-curvature R2 shown in FIG. 4.

The reason is because, as described above, the radius of curvature R becomes relatively large when the own-vehicle is traveling on the straight route and when the rotational angular velocity of the own-vehicle is essentially zero, and becomes relatively small when the own-vehicle enters the curve from the straight route and when the rotational angular velocity of the own-vehicle changes and becomes large. More specifically, when the own-vehicle enters a straight route from a curve, the not-shown storage section of the calculation section 103 stores therein radius of curvatures that becomes sequentially large from the radius of curvature R having a relatively long time period since being stored to the radius of curvature R having a relatively short time period since being stored.

Furthermore, if the calculation section 103 conducts the filtering process by setting a relatively large filtering constant for multiplying the radius of curvature R having a relatively short time period since being stored and by setting a relatively small filtering constant for multiplying the radius of curvature R having a relatively long time period since being stored, as described above, an estimated radius-of-curvature that is close to an actual radius of curvature of the travel route in which the own-vehicle is currently traveling is calculated. Therefore, as shown in the example in FIG. 4, when the own-vehicle enters a straight route from a curve, if the calculation section 103 conducts the filtering process by setting a relatively large filtering constant for multiplying the radius of curvature R having a relatively short time period since being stored and by setting a relatively small filtering constant for multiplying the radius of curvature R having a relatively long time period since being stored, a relatively large estimated radius-of-curvature R1 is calculated.

On the other hand, as shown in FIG. 4, when the own-vehicle enters a straight route from a curve, if the calculation section 103 conducts a filtering process by setting a relatively small filtering constant for multiplying the radius of curvature R having a relatively short time period since being stored and by setting a relatively large filtering constant for multiplying the radius of curvature R having a relatively long time period since being stored, as described above, because an estimated radius-of-curvature that is close to an actual radius of curvature of a travel route in which a relatively long time has elapsed ever since the own-vehicle has been traveling in the travel route is calculated, a relatively small estimated radius-of-curvature R2 is calculated.

As described above with reference to FIG. 3 and FIG. 4, if the calculation section 103 sets a relatively large filtering constant for multiplying the radius of curvature R having a relatively short time period since being stored and sets a small filtering constant for multiplying the radius of curvature R having a relatively long time period since being stored, because a filtering constant, for multiplying a radius of curvature R calculated based on a rotational angular velocity that is detected at a time relatively recent to the time when the estimated radius-of-curvature R is calculated, becomes large, an estimated radius-of-curvature that is close to an actual radius of curvature of a travel route in which the own-vehicle is currently traveling and that has a high responsivity can be calculated and estimated. On the other hand, if the calculation section 103 conducts the filtering process by setting a relatively small filtering constant for multiplying the radius of curvature R having a relatively short time period since being stored and by setting a large filtering constant for multiplying the radius of curvature R having a relatively long time period since being stored, because a filtering constant, for multiplying a radius of curvature R calculated based on a rotational angular velocity detected at a time going back for a relatively long time period in the past since the estimated radius-of-curvature has been calculated, becomes large, a highly stable estimated radius-of-curvature, which is close to an actual radius of curvature of a travel route in which a relatively long time has elapsed ever since the own-vehicle has been traveling in the travel route and which is not influenced by a rotational angular velocity detected at a time relatively recent to the time when the estimated radius-of-curvature is calculated, is calculated and estimated.

Thus, by changing a filtering constant when conducting the filtering process as described above, the calculation section 103 of the present embodiment can change characteristics of the filtering process between stability and responsivity. In the following, an estimated radius-of-curvature calculated in the filtering process for the previously described high responsivity is referred to as the estimated radius-of-curvature R1, and an estimated radius-of-curvature calculated in the filtering process for the previously described high stability is referred to as the estimated radius-of-curvature R2. Furthermore, in the following, a filtering constant used in the filtering process for high responsivity is referred to as a high responsivity filtering constant, and a filtering constant used in the filtering process for high stability is referred to as a high stability filtering constant.

Even when the own-vehicle is traveling on a straight route, the driver is steering and conducting fine adjustments to the traveling direction of the own-vehicle such that the own-vehicle consistently travels along the straight route. In this case, a change in a rotational angular velocity detected at a relatively recent time from the time when the estimated radius-of-curvature is calculated is small, thereby a change in a radius of curvature R having a relatively short time period since being stored will also be small. Therefore, significant error is not generated between the estimated radius-of-curvature R1 calculated by the calculation section 103 and the actual radius of curvature of the straight route. However, when the own-vehicle is traveling on the straight route, the estimated radius-of-curvature R2 becomes relatively closer to the actual radius of curvature of the straight route than the estimated radius-of-curvature R1, since the estimated radius-of-curvature R2 is not influenced, as described above, by a rotational angular velocity detected at a time relatively recent to the time when the estimated radius-of-curvature is calculated.

Furthermore, for example, when the own-vehicle is traveling on a curve, if the high stability filtering process is conducted, because the calculation section 103 calculates the estimated radius-of-curvature R2 which is not influenced by the rotational angular velocity detected at a time relatively recent to the time when the estimated radius-of-curvature is calculated, a relatively large error is generated between the estimated radius-of-curvature R2 and the actual radius of curvature of the curve in which the own-vehicle is currently traveling, even though a change of the rotational angular velocity detected at a time relatively recent to the time when the estimated radius-of-curvature is calculated is relatively large. Therefore, when the own-vehicle is traveling on a curve, the estimated radius-of-curvature R1 calculated using the high responsivity filtering process becomes relatively close to an actual radius of curvature of the curve in which the own-vehicle is currently traveling, since the filtering constant, for multiplying the radius of curvature R calculated based on a rotational angular velocity detect at a time relatively recent to the time when the estimated radius-of-curvature is calculated as described above, becomes relatively large.

Since the own-vehicle generally travels on both a straight route and a curve, when using the method of calculating the estimated radius-of-curvature by conducting the filtering process on a radius of curvature R as described above, it is necessary for the calculation section 103 to conduct both filtering processes of the high responsivity filtering process and the high stability filtering process, and to calculate both the estimated radius-of-curvature R1 and the estimated radius-of-curvature R2. Then, after calculating the estimated radius-of-curvature R1 and the estimated radius-of-curvature R2, if the calculation section 103 determines that the own-vehicle has entered a curve from a straight route, or determines that the own-vehicle has entered a straight route from a curve, the calculation section 103 selects the characteristics of the filtering process in order to calculate an estimated radius-of-curvature that is appropriate for a travel route in which the own-vehicle has entered.

A method described next may be used as the method used by the calculation section 103 for determining the time when the own-vehicle has entered a curve from a straight route and the time when the own-vehicle has entered a straight route from a curve. First, in order to have the calculation section 103 determine whether or not the own-vehicle has entered a curve from a straight route, it is determined whether or not both of the conditions of numerical formula (2) and numerical formula (3) shown in the following are satisfied.

$$R1 < R\_in \quad (2)$$

$$|Y1 - Y2| > Yaw\_in \quad (3)$$

Here, a threshold R_in in the numerical formula (2) described above is a threshold predetermined for the estimated radius-of-curvature R1 calculated by the high responsivity filtering process, and the numerical formula (2) is a formula for determining whether or not the estimated radius-of-curvature R1 calculated by the high responsivity filtering process is less than the threshold R_in. In more detail, the condition of the numerical formula (2) is satisfied when the filtering constant, for multiplying the radius of curvature R calculated based on the rotational angular velocity that is detected at a time relatively recent to the time when the estimated radius-of-curvature is calculated, is relatively large; when the estimated radius-of-curvature R1, which relatively highly reflects the actual radius of curvature of the travel route in which the own-vehicle is currently traveling, is less than the threshold R_in; and when the own-vehicle is traveling on a curve.

Furthermore, an estimated rotational angular velocity Y1 of the numerical formula (3) is a numerical value estimated by modifying the numerical formula (1) based on a traveling velocity represented by the estimated radius-of-curvature R1 and the traveling velocity information, and by conducting a back-calculation to obtain a rotational angular velocity. Similarly, an estimated rotational angular velocity Y2 of the numerical formula (3) is a numerical value estimated by modifying the numerical formula (1) based on a traveling velocity represented by the estimated radius-of-curvature R2 and the traveling velocity information, and by conducting a back-calculation to obtain a rotational angular velocity.

Note that, a traveling velocity for calculating the estimated rotational angular velocity Y1 may be a traveling velocity used when calculating the estimated radius-of-curvature R1 in order to calculate the estimated rotational angular velocity Y1, and may be a traveling velocity represented by the traveling velocity information acquired when calculating the estimated rotational angular velocity Y1. The same can be said for the estimated rotational angular velocity Y2; and a traveling velocity for calculating the estimated rotational angular velocity Y2 may be a traveling velocity used when calculating the estimated radius-of-curvature R1 in order to calculate the estimated rotational angular velocity Y2, and may be a traveling velocity represented by the traveling velocity information acquired when calculating the estimated rotational angular velocity Y2.

The estimated rotational angular velocity Y1 is an estimated rotational angular velocity obtained by conducting a back-calculation based on the high responsivity estimated radius-of-curvature R1; more specifically, is a rotational angular velocity that corresponds to the estimated radius-of-curvature R1 calculated by the high responsivity filtering process in which a filtering constant for multiplying the latest radius of curvature R is relatively large; and is a numerical value estimating a rotational angular velocity in accordance with the type of the travel route (for example, straight route and curve) in which the own-vehicle is currently traveling. Furthermore, the estimated rotational angular velocity Y2 is an estimated rotational angular velocity obtained by conducting a back-calculation based on the high stability estimated radius-of-curvature R2; more specifically, is a rotational angular velocity that corresponds to the estimated radius-of-curvature R2 calculated by the high stability filtering process in which a filtering constant for multiplying a radius of curvature R stored in the past is relatively large; and is a numerical value estimating a rotational angular velocity in accordance with the type of the travel route (for example, straight route and curve) in which the own-vehicle has been traveling in the past.

Therefore, the condition, of whether an absolute value of a difference obtained by subtracting the estimated rotational angular velocity Y2 from the estimated rotational angular velocity Y1 is larger than a predetermined threshold Yaw_in, shown in the numerical formula (3) is satisfied, when there is a change between the type of the travel route in which the own-vehicle is currently traveling and the type of the travel route in which the own-vehicle has been traveling in the past.

Here, another conceivable method for determining if there is a change between the type of the travel route in which the own-vehicle is currently traveling and the type of the travel route in which the own-vehicle has been traveling in the past, is a method of determining whether or not an absolute value of a difference obtained by subtracting the estimated radius-of-curvature R2 from the estimated radius-of-curvature R1 is larger than a determined threshold. However, for example, if a difference obtained by subtracting the estimated radius-of-curvature R2 from the estimated radius-of-curvature R1 is 300 m when the actual radius of curvature of the travel route in which the own-vehicle is currently traveling is 12000 m, since a ratio of the difference to the actual radius of curvature is small, it cannot necessarily be considered as a change in the type of the travel route of the own-vehicle. On the other hand, for example, if a difference obtained by subtracting the estimated radius-of-curvature R2 from the estimated radius-of-curvature R1 is 300 m when the actual radius of curvature of the travel route in which the own-vehicle is currently traveling is 500 m, since a ratio of the difference to the actual radius of curvature is large, it can be considered as a change in the type of the travel route of the own-vehicle. Thus, there are cases where a precise determination cannot necessarily be conducted by using the method of determining whether or not there is a change between the type of the travel route in which the own-vehicle is currently traveling and the type of the travel route in which the own-vehicle has been traveling in the past based on the difference between the estimated radius-of-curvature R1 and the estimated radius-of-curvature R2. Therefore, the calculation section 103 of the present embodiment uses the estimated rotational angular velocity obtained by back-calculating a rotational angular velocity from the estimated radius-of-curvature, in order to determine whether or not there has been a change between the type of the travel route in which the own-vehicle is currently traveling and the type of the travel route in which the own-vehicle has been traveling in the past.

As described above, when the condition of the numerical formula (2) is satisfied and when the condition of numerical formula (3) is satisfied, the own-vehicle is traveling on a curve, and there has been a change between the type of the travel route in which the own-vehicle is currently traveling and the type of the travel route in which the own-vehicle has been traveling in the past. Therefore, the calculation section 103 determines whether or not the own-vehicle has entered a curve from a straight route when the calculation section 103 determines whether or not the condition of the numerical formula (2) is satisfied and the condition of the numerical formula (3) is satisfied.

Next, the calculation section 103 determines whether or not the own-vehicle has entered a straight route from a curve when the calculation section 103 determines whether or not the following conditions of numerical formula (4) and numerical formula (5) are respectively satisfied.

$$R2 < R\_out \quad (4)$$

$$|Y1 - Y2| > Yaw\_out \quad (5)$$

Here, a threshold R_out in the numerical formula (4) is a threshold predetermined for the estimated radius-of-curvature R2 calculated by the high stability filtering process, and the numerical formula (4) is a formula for determining whether or not the estimated radius-of-curvature R2 calculated by the high stability filtering process is less than the threshold R_out. In more detail, the numerical formula (4) is satisfied, when the filtering constant, for multiplying the radius of curvature R calculated based on the rotational angular velocity that is detected at a time go back for a relatively long time period in the past since the estimated radius-of-curvature has been calculated, is relatively large; when the estimated radius-of-curvature R2, which relatively highly reflects the radius of curvature R of the travel route in which the own-vehicle has been traveling in the past, is less than the threshold R_out; and when the own-vehicle has been traveling on a curve in the past.

Similarly to the case when the condition shown in the numerical formula (3) is satisfied, the condition shown in the numerical formula (5) is satisfied when there is a change between the type of the travel route in which the own-vehicle is currently traveling and the type of the travel route in which the own-vehicle has been traveling in the past. Note that, the threshold Yaw_in and the threshold Yaw_out may be values that are mutually identical to each other, or may be values that are mutually different from each other.

As described above, when the condition of the numerical formula (4) is satisfied and when the condition of the numerical formula (5) is satisfied, the own-vehicle has been traveling on a curve in the past, and there has been a change between the type of the travel route in which the own-vehicle is currently traveling and the type of the travel route in which the own-vehicle has been traveling in the past. Therefore, the calculation section 103 determines whether or not the own-vehicle has entered a straight route from a curve when the calculation section 103 determines whether or not the condition of the numerical formula (4) is satisfied and the condition of the numerical formula (5) is satisfied.

Furthermore, if the calculation section 103 determines that the own-vehicle has entered a curve from a straight route, the calculation section 103 selects the estimated radius-of-curvature R1 calculated by the high responsivity filtering process, among the estimated radius-of-curvature R1 and the estimated radius-of-curvature R2. With this, when the own-vehicle enters a curve from a straight route, the calculation section 103 can select an estimated radius-of-curvature that is relatively close to a radius of curvature of the curve, as described above. On the other hand, if the calculation section 103 determines that the own-vehicle has entered a straight route from a curve, the calculation section 103 selects the estimated radius-of-curvature R2 calculated with the high stability filtering process, among the estimated radius-of-curvature R1 and the estimated radius-of-curvature R2. With this, when the own-vehicle enters a straight route from a curve, the calculation section 103 can select the estimated radius-of-curvature that is relatively close to a radius of curvature of the straight route, as described above.

When the calculation section 103 selects the estimated radius-of-curvature, the calculation section 103 generates estimated radius-of-curvature information representing an estimated radius-of-curvature KR which is a weighted average of the selected estimated radius-of-curvature and an estimated radius-of-curvature that is not selected. The process conducted by the calculation section 103 to obtain the weighted average of the selected estimated radius-of-curvature and the unselected estimated radius-of-curvature will be described later. The estimated radius-of-curvature information generated by the calculation section 103 is acquired by a collision safety device 201 and an inter-vehicular distance maintenance control device 202 included in a safety apparatus 2 shown in FIG. 1.

The collision safety device 201 is a device for preventing a collision between the own-vehicle and, for example, an object (for example, another vehicle, a pedestrian, a guard rail, and the like), based on, a relative distance and a relative velocity to the object, a direction in which the object exists, which are measured by a radar which is not shown, the estimated radius-of-curvature KR represented by the estimated radius-of-curvature information generated by the calculation section 103, and the like. When the collision safety device 201 determines that there is a possibility of a collision between the own-vehicle and the object by utilizing a publicly known method and by using, for example, the estimated radius-of-curvature KR represented by the estimated radius-of-curvature information as a prediction result of the traveling direction of the own-vehicle, the collision safety device 201 prevents the collision by automatically operating brakes or automatically winding up and removing slacks of seat belts.

Furthermore, the inter-vehicular distance maintenance control device 202 is a device for controlling a pedal position of an accelerator of the own-vehicle so as to automatically maintain, at a predetermined distance, an inter-vehicular distance from a preceding vehicle traveling in a traveling lane that is identical to a traveling lane of the own-vehicle, by using a publicly known method and based on, for example, the relative distance and a relative velocity to the object, the direction in which the object exists, which are measured by the radar which is not shown, the estimated radius-of-curvature KR represented by the estimated radius-of-curvature information generated by the calculation section 103, and the like.

Here, in a case where the calculation section 103 generates an estimated radius-of-curvature information that directly indicates the selected estimated radius-of-curvature, if the estimated radius-of-curvature is switched, for example, if the estimated radius-of-curvature R1 is selected when the estimated radius-of-curvature R2 has been selected or if the estimated radius-of-curvature R2 is selected when the estimated radius-of-curvature R1 has been selected, an estimated radius-of-curvature information representing an estimated radius-of-curvature that largely changes instantaneously is generated. When the estimated radius-of-curvature information representing the estimated radius-of-curvature that largely changes instantaneously is generated, for example, the collision safety device 201 that has acquired the estimated radius-of-curvature information may wrongly determine that the radius of curvature of the travel route of the own-vehicle has largely changed even though it has not actually been largely changed instantaneously, and may improperly operate devices included in the safety apparatus 2, such as improperly operating the brakes.

Therefore, if the estimated radius-of-curvature R1 is selected when the estimated radius-of-curvature R2 has been selected or if the estimated radius-of-curvature R2 is selected when the estimated radius-of-curvature R1 has been selected, in order to prevent the estimated radius-of-curvature representing the estimated radius-of-curvature information from largely changing instantaneously, the calculation section 103 generates the estimated radius-of-curvature information representing the estimated radius-of-curvature KR which is, as described above, a weighted average of the selected estimated radius-of-curvature and the unselected estimated radius-of-curvature, while gradually increasing or decreasing each weight multiplied to those. Described in the following is a process for obtaining the weighted average of the estimated radius-of-curvature selected by the calculation section 103 and the estimated radius-of-curvature that has not been selected by the calculation section 103, namely, the estimated radius-of-curvature R1 and the estimated radius-of-curvature R2, while gradually increasing or decreasing the weights multiplied to those.

If the conditions of the numerical formula (2) and the numerical formula (3) are respectively satisfied, thereby if the own-vehicle is determined to have entered a curve from a straight route, the calculation section 103 selects the estimated radius-of-curvature R1 among the estimated radius-of-curvature R1 and the estimated radius-of-curvature R2. When the estimated radius-of-curvature R1 is selected, the calculation section 103 generates response weight gradual increase information in order to, among the weights that are respectively multiplied to the estimated radius-of-curvature R1 and the estimated radius-of-curvature R2, gradually increase, relatively, a weight multiplied to the estimated radius-of-curvature R1, and gradually decrease, relatively, a weight multiplied to the estimated radius-of-curvature R2, such that the estimated radius-of-curvature KR which is a weighted average will gradually become close to the estimated radius-of-curvature R1; and stores the response weight gradual increase information in a storage section which is not shown. Note that, if the response weight information has been already stored in the storage section which is not shown, the calculation section 103 may newly store and update the response weight gradual increase information, or may keep the stored response weight information.

On the other hand, if the conditions of the numerical formula (4) and the numerical formula (5) are both satisfied, thereby if the own-vehicle is determined to have entered a straight route from a curve, the calculation section 103 selects the estimated radius-of-curvature R2 among the estimated radius-of-curvature R1 and the estimated radius-of-curvature R2. When the estimated radius-of-curvature R2 is selected, the calculation section 103 deletes the response weight gradual increase information from the storage section which is not shown, in order to, among the weights that are respectively multiplied to the estimated radius-of-curvature R1 and the estimated radius-of-curvature R2, gradually decrease, relatively, the weight multiplied to the estimated radius-of-curvature R1, and gradually increase, relatively, the weight multiplied to the estimated radius-of-curvature R2, such that the estimated radius-of-curvature KR which is a weighted average will gradually become close to the estimated radius-of-curvature R2. Note that, at the time when the calculation section 103 is about delete the response weight gradual increase information, if the response weight gradual increase information is not stored in the storage section which is not shown, the process of deleting the response weight gradual increase information is not conducted.

After selecting the estimated radius-of-curvature R1 or the estimated radius-of-curvature R2, the calculation section 103 determines whether or not the previously described response weight gradual increase information is stored in the storage section which is not shown. If the response weight gradual increase information is determined to be stored in the storage section which is not shown, the calculation section 103 calculates the estimated radius-of-curvature KR which is a weighted average of the estimated radius-of-curvature R1 and the estimated radius-of-curvature R2, after gradually increasing, relatively, the weight multiplied to the estimated radius-of-curvature R1, and gradually decreasing, relatively, the weight multiplied to the estimated radius-of-curvature R2 essentially simultaneously. On the other hand, if the response weight gradual increase information is determined not to be stored in the storage section which is not shown, the calculation section 103 calculates the estimated radius-of-curvature KR which is a weighted average of the estimated radius-of-curvature R1 and the estimated radius-of-curvature R2, after gradually increasing, relatively, the weight multiplied to the estimated radius-of-curvature R2, and gradually decreasing, relatively, the weight multiplied to the estimated radius-of-curvature R1 essentially simultaneously.

A numerical formula for calculating the weighted average of the estimated radius-of-curvature R1 and the estimated radius-of-curvature R2, and a numerical formula for determining the weight multiplied to the estimated radius-of-curvature R1, which are both conducted by the calculation section 103, will be respectively shown in the following.

$$KR = C \times R1 + (1 - C)R2 \tag{6}$$

$$C = \frac{k}{T}i \tag{7}$$

Here, the numerical formula (6) is a numerical formula for calculating the estimated radius-of-curvature KR which is a weighted average; and C is the weight multiplied to the estimated radius-of-curvature R1. Furthermore, the numerical formula (7) is a numerical formula for determining the weight C multiplied to the estimated radius-of-curvature R1, i is a weight counter, and k/T is a constant.

As it is obvious from the numerical formula (6), the calculation section 103 calculates the weighted average by multiplying the estimated radius-of-curvature R1 to the weight C and by multiplying the estimated radius-of-curvature R2 to a weight which is a difference obtained by subtracting C from 1. Therefore, the calculation section 103 can gradually increase or gradually decrease the weights multiplied respectively to the estimated radius-of-curvature R1 the estimated radius-of-curvature R2 in an opposing relation of gradual increase or decrease, by gradually increasing or gradually decreasing the weight C shown in the numerical formula (6).

In order to determine the weight C shown in the numerical formula (6), the calculation section 103 conducts the calculation of the numerical formula (7). As it is obvious from the numerical formula (7), the calculation section 103 gradually increases or gradually decreases the weight C of the estimated radius-of-curvature R1, by increasing or decreasing the weight counter i by 1 every time a process as described later is repeated. Although an upper limit value and a lower limit value of the weight C can respectively be arbitrary values, representatively, the upper limit value is 1 and the lower limit value is zero. Furthermore, k/T of the numerical formula (7) is, for example, determined so as to increase for a predetermined amount when the calculation section 103 increases i by 1.

After the calculation section 103 calculates the estimated radius-of-curvature KR by conducting the calculation shown in the numerical formula (6), the calculation section 103 generates the estimated radius-of-curvature information representing the calculated estimated radius-of-curvature KR.

The above is the description of processes of calculating the weighted average of the estimated radius-of-curvature R1 and the estimated radius-of-curvature R2 conducted by the calculation section 103. Next, the above described processes conducted by the calculation section 103 will be described with reference to a flowchart shown in FIG. 5.

At step S101, the calculation section 103 calculates the above described radius of curvature R based on the rotational angular velocity represented by the rotational angular velocity information acquired from the yaw rate detection section 101 and the traveling velocity represented by the traveling velocity information acquired from the velocity detection section 102; and stores those in the storage section which is not shown. When the process at step S101 is completed, the calculation section 103 advances the process to step S102.

At step S102, the calculation section 103 calculates both the estimated radius-of-curvature R1 and the estimated radius-of-curvature R2, based on, among the radius of curvatures R stored in the storage section which is not shown, a predetermined number of radius of curvatures R used for the filtering process from the latest radius of curvature R to a radius of curvature R having a relatively long time period since being stored. When the process at step S102 is completed, the calculation section 103 advances the process to step S103.

At step S103, the calculation section 103 calculates the estimated rotational angular velocity Y1 as described above from the estimated radius-of-curvature R1 calculated at step S102, and calculates the estimated rotational angular velocity Y2 as described above from the estimated radius-of-curvature R2 calculated at step S102. When the process at step S103 is completed, the calculation section 103 advances the process to step S104.

At step S104, the calculation section 103 determines whether or not respective conditions (condition 1) of the numerical formula (2) and the numerical formula (3) are satisfied, based on the estimated radius-of-curvature R1 calculated at step S102, and the estimated rotational angular velocity Y1 and the estimated rotational angular velocity Y2 calculated at step S103. At step S104, if it is determined that the condition 1 is satisfied, the calculation section 103 advances the process to step S105. On the other hand, at step S104, if it is determined that the condition 1 is not satisfied, the calculation section 103 advances the process to step S106.

At step S105, the calculation section 103 determines that the own-vehicle has entered a curve from a straight route, selects the estimated radius-of-curvature R1, generates the response weight gradual increase information as describe above, and stores the information in the storage section which is not shown. When the process at step S105 is completed, the calculation section 103 advances the process to step S108.

At step S106, the calculation section 103 determines whether or not respective conditions (condition 2) of the numerical formula (4) and the numerical formula (5) are satisfied, based on the estimated radius-of-curvature R1 calculated at step S102, and the estimated rotational angular velocity Y1 and the estimated rotational angular velocity Y2 calculated at step S103. At step S106, if it is determined that the condition 2 is satisfied, the calculation section 103 advances the process to step S107. On the other hand, at step S106, if it is determined that the condition 2 is not satisfied, the calculation section 103 determines that both conditions of the condition 1 and the condition 2 are not satisfied and that there is no change in the type of the travel route of the own-vehicle as described above, and advances the process to step S108 while continuing to select the estimated radius-of-curvature that has been already selected.

at step S107, the calculation section 103 determines that the own-vehicle has entered a straight route from a curve, selects the estimated radius-of-curvature R2, and deletes the response weight gradual increase information from the storage section, which is not shown, as described above. When the process at step S107 is completed, the calculation section 103 advances the process to step S108.

At step S108, the calculation section 103 determines whether or not the response weight gradual increase information is stored in the storage section which is not shown. At step S108, if it is determined that the response weight gradual increase information is stored in the storage section which is not shown, the calculation section 103 advances the process to step S109. On the other hand, at step S108, if it is determined that the response weight gradual increase information is not stored in the storage section which is not shown, the calculation section 103 advances the process to step S111.

At step S109, the calculation section 103 determines whether or not the weight counter i is at an upper limit value. At step S109, if it is determined that the weight counter i is at an upper limit value, the calculation section 103 advances the process to step S113. On the other hand, if it is determined that the weight counter i is not at an upper limit value, the calculation section 103 advances the process to step S110.

At step S110, the calculation section 103 increases the weight counter i by 1. When the process at step S110 is completed, the calculation section 103 advances the process to step S113.

At step S111, the calculation section 103 determines whether or not the weight counter i is at a lower limit value. At step S111, if it is determined that the weight counter i is at a lower limit value, the calculation section 103 advances the process to step S113. On the other hand, if it is determined that the weight counter i is not at a lower limit value, the calculation section 103 advances the process to step S112.

At step S112, the calculation section 103 decreases the weight counter i by 1. When the process at step S112 is completed, the calculation section 103 advances the process to step S113.

At step S113, the calculation section 103 calculates the weight C from the calculation of the numerical formula (7) by using the weight counter i at the time of the process at step S113; and based on the calculated weight C, the estimated radius-of-curvature R1 calculated at step S102, and the estimated radius-of-curvature R2, the calculation section 103 calculates the estimated radius-of-curvature KR which is a weighted average obtained from the calculation of the numerical formula (6). The calculation section 103 generates the estimated radius-of-curvature information representing the estimated radius-of-curvature KR which is calculated for the estimated radius-of-curvature KR; and returns the process to step S101.

The above is the description of the processes of the calculation section 103 according to the first embodiment. By conducting the processes shown in the flowchart in FIG. 5, if, for example, the own-vehicle enters a curve from a straight route and the calculation section 103 determines that the condition 1 is satisfied at step S104, the estimated radius-of-curvature R1 calculated by conducting the high responsivity filtering process suitable for the curve can be selected at step S105. Furthermore, by conducting the processes shown in the flowchart in FIG. 5, if, for example, the own-vehicle enters a straight route from a curve and the calculation section 103 determines that the condition 2 is satisfied at step S106, the estimated radius-of-curvature R2 calculated by conducting the high stability filtering process suitable for the straight route can be selected at step S107.

Furthermore, if there is no change in the type of the travel route in which the own-vehicle is traveling and the own-vehicle is continuously traveling on a curve or a straight route, thereby if neither of the condition 1 nor the condition 2 are satisfied, the calculation section 103 directly advances from the process at step S104 to the process at step S108, and continues to select the estimated radius-of-curvature suitable for the travel route in which the traveling is being continued, since the response weight gradual increase information is neither generated nor deleted. When there is no change in the type of the travel route in which the own-vehicle is traveling and when the response weight gradual increase information is neither generated nor deleted, since the calculation section 103 repeats, among step S110 and step S112, the process at the lastly conducted step, and conducts the filtering process described above while continuing to gradually increase the weight multiplied to the estimated radius-of-curvature that is already selected, the estimated radius-of-curvature KR represented by the estimated radius-of-curvature information can be made close to the estimated radius-of-curvature suitable for the type of the travel route in which the traveling is conducted.

Figure 5:
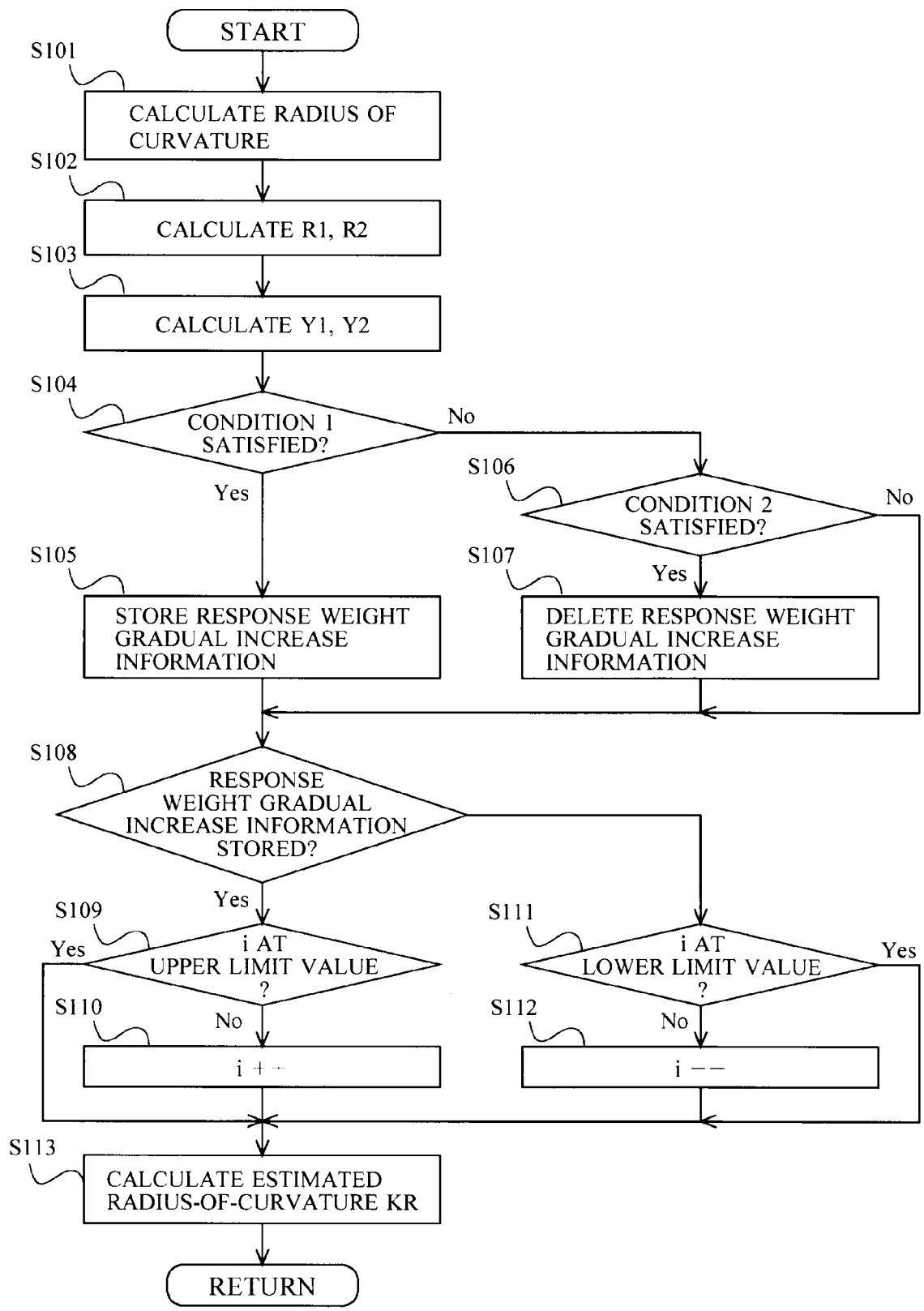
FIG. 5 is a flowchart showing processes of a calculation section of a first embodiment.

Furthermore, by conducting the processes shown in the flowchart in FIG. 5, even when the selected estimated radius-of-curvature changes between the estimated radius-of-curvature R1 and the estimated radius-of-curvature R2, the calculation section 103 can prevent the estimated radius-of-curvature represented by the estimated radius-of-curvature information from sharply changing, by conducting the process at step S110 or step S112 and gradually increasing or gradually decreasing the weight counter i, and then calculating the weighted averages indicated by the numerical formula (6) and the numerical formula (7) at step S113.

Furthermore, with the travel route estimation device 1 according to the first embodiment, since the estimated radius-of-curvature is calculated and estimated based on the rotational angular velocity and on the traveling velocity of the own-vehicle, even when the own-vehicle is traveling on a travel route that does not have any objects installed on the route, the radius of curvature of the travel route can be accurately estimated as one shape of the travel route.

Note that, in the first embodiment, although the travel route estimation device 1 and the safety apparatus 2 are described as having different configurations, one part or the entirety of the travel route estimation device 1 may be integrally configured with one part or the entirety of the safety apparatus 2. For example, the collision safety device 201 may include the yaw rate detection section 101, the velocity detection section 102, and the calculation section 103. Furthermore, the calculation section 103 included in the collision safety device 201 may, for example, generate information representing the estimated radius-of-curvature R1, the estimated radius-of-curvature R2, and the estimated radius-of-curvature KR, such that other devices such as the inter-vehicular distance maintenance control device 202 included in the safety apparatus 2 can acquire the information.

(Second Embodiment)

In the first embodiment, the calculation section 103 has been described to calculate the estimated radius-of-curvature KR which is a weighted average, while conducting both the filtering process for calculating the estimated radius-of-curvature R1 and the filtering process for calculating the estimated radius-of-curvature R2. However, in the present invention, depending on the type of the travel route in which the own-vehicle is traveling, a filtering constant used in the filtering processes for calculating an estimated radius-of-curvature can be determined from among either one of the estimated radius-of-curvature R1 and estimated radius-of-curvature R2 described in the first embodiment, and then, an estimated radius-of-curvature calculated in a filtering process using the determined filtering constant may be defined as the estimated radius-of-curvature KR described in the first embodiment.

In more detail, the calculation section 103 stores, in the storage section which is not shown in advance, filtering constants used in the high responsivity filtering process for calculating the estimated radius-of-curvature R1 described in the first embodiment, and filtering constants used in the high stability filtering process for calculating the estimated radius-of-curvature R2 described in the first embodiment.

Here, as described in the first embodiment, the filtering constants used in the high responsivity filtering process is a relatively large filtering constant for multiplying a radius of curvature R having a relatively short time period since being stored, and a relatively small filtering constant for multiplying a radius of curvature R having a relatively long time period since being stored, among the radius of curvatures R successively stored by the calculation section 103. More specific examples of the filtering constants used in the high responsivity filtering process are filtering constants predetermined so as to become sequentially smaller from a filtering constant for multiplying the latest radius of curvature R, to a filtering constant for multiplying the oldest radius of curvature R, among the radius of curvatures R used in the filtering process.

On the other hand, as described in the first embodiment, the filtering constants used in the high stability filtering process is a relatively small filtering constant for multiplying a radius of curvature R having a relatively short time period since being stored, and a relatively large filtering constant for multiplying a radius of curvature R having a relatively long time period since being stored. More specific examples of the filtering constants used in the high stability filtering process are filtering constants predetermined so as to become sequentially large from a filtering constant for multiplying the latest radius of curvature R, to a filtering constant for multiplying the oldest radius of curvature R, among the radius of curvatures R used in the filtering process.

Then, the calculation section 103 calculates the radius of curvature R by using the method described in the first embodiment, based on rotational angular velocity information indicated by the rotational angular velocity information generated by the yaw rate detection section 101, and velocity information indicated by the velocity information generated by the velocity detection section 102; and stores those in the storage section which is not shown. When the radius of curvature R is stored in the storage section which is not shown, the calculation section 103 determines whether or not the stored radius of curvature R is less than a predetermined threshold R_in2. If the stored radius of curvature R is less than the threshold R_in2, the calculation section 103 determines that the own-vehicle is traveling on a travel route having a relatively small radius of curvature R, namely a curve, and selects the filtering constant used in the high responsivity filtering process for calculating the estimated radius-of-curvature R1. On the other hand, if the stored radius of curvature R is not less than the threshold R_in2, the calculation section 103 determines that the own-vehicle is traveling on a travel route having a relatively large radius of curvature R, namely a straight route, and selects the filtering constant used in the high stability filtering process for calculating the estimated radius-of-curvature R2.

When the filtering constant is selected, the calculation section 103 calculates an estimated radius-of-curvature from the filtering process using the selected filtering constant. For example, when the filtering constant for calculating the estimated radius-of-curvature R1 is selected, the calculation section 103 calculates an estimated radius-of-curvature by multiplying the selected filtering constant to each of the radius of curvatures R used in the filtering processes, up to a radius of curvature R which is stored in the past preceding, by a predetermined number, the latest radius of curvature R stored in the storage section which is not shown, and by adding the products of those. On the other hand, for example, when the filtering constant for calculating the estimated radius-of-curvature R2 is selected, the calculation section 103 calculates an estimated radius-of-curvature by multiplying the select filtering constant to each of the radius of curvatures R used in the filtering processes, up to a radius of curvature R which is stored in the past preceding, by a predetermined number, the latest radius of curvature R stored in the storage section which is not shown, and adding the products of those.

With this, the calculation section 103 can select the filtering constant in accordance with a calculation result of the radius of curvature of the travel route in which the own-vehicle is traveling, and can calculate the estimated radius-of-curvature R1 for high responsivity and the estimated radius-of-curvature R2 for high stability.

Figure 6:
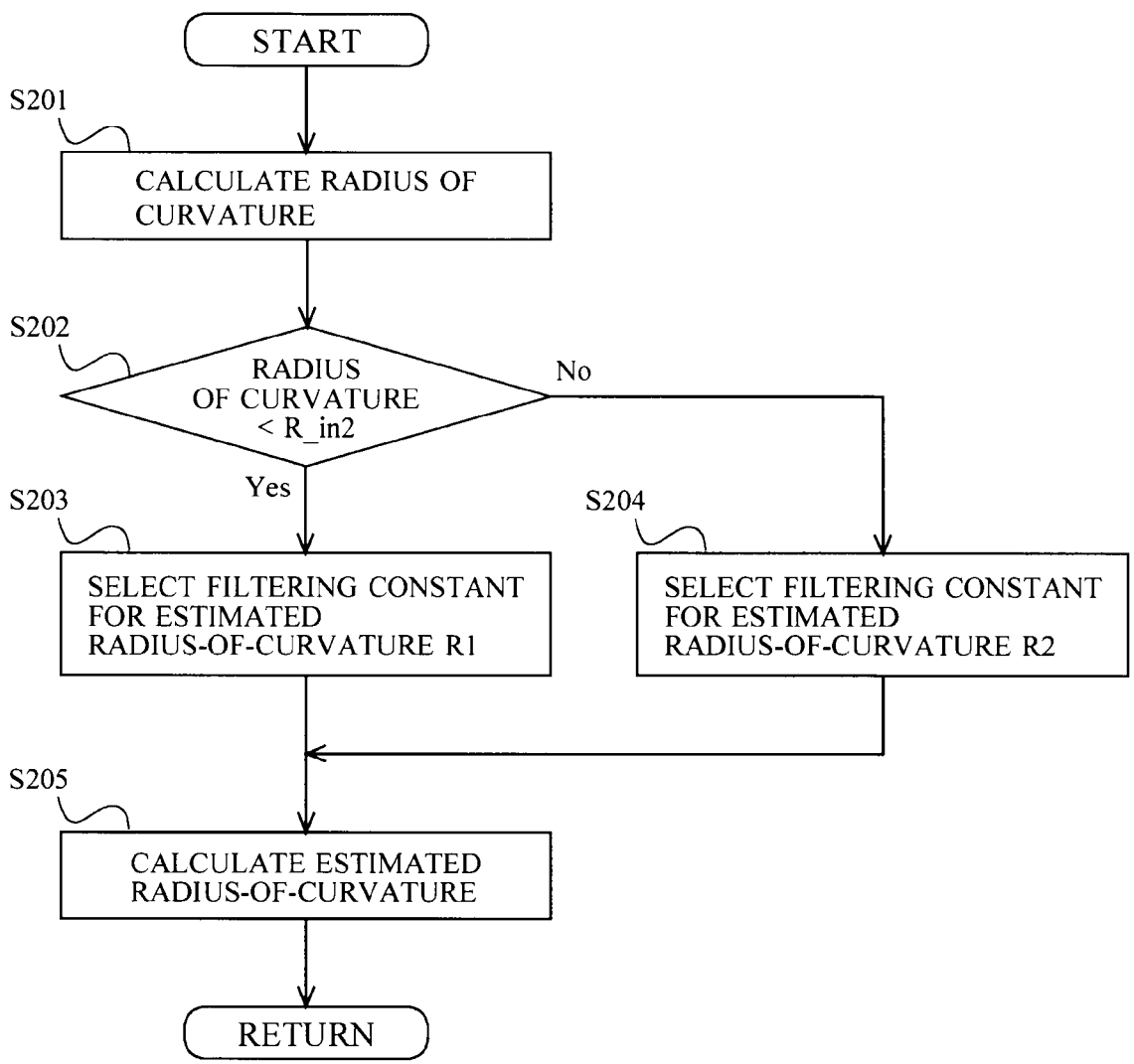
FIG. 6 is a flowchart showing processes of a calculation section of a second embodiment.

Next, processes of the calculation section 103 according to a second embodiment will be described with reference to processes shown in a flowchart in FIG. 6. Note that, except for the calculation section 103 of the second embodiment, the configuration of the travel route estimation device 1 is similar to that of the first embodiment, thereby descriptions thereof are omitted.

At step S201, the calculation section 103 calculates the above described radius of curvature R based on the rotational angular velocity indicated by the rotational angular velocity information acquired by the yaw rate detection section 101 and the traveling velocity indicated by the traveling velocity information acquired by the velocity detection section 102; and stores those in the storage section which is not shown. When the process at step S201 is completed, the calculation section 103 advances the process to step S202.

At step S202, the calculation section 103 determines whether or not the radius of curvature R calculated at step S201 is less than the predetermined threshold R_in2. At step S202, if it is determined that the calculate radius of curvature R is less than the threshold R_in2, the calculation section 103 determines that the own-vehicle is traveling on a curve, and advances the process to step S203. On the other hand, at step S202, if it is determined that the calculate radius of curvature R is not less than the threshold R_in2, the calculation section 103 determines that the own-vehicle is traveling on a straight route, and advances the process to step S204.

At step S203, the calculation section 103 selects the predetermined filtering constant used in the filtering process for calculating the estimated radius-of-curvature R1 described in the first embodiment. When the process at step S203 is completed, the calculation section 103 advances the process to step S205.

At step S204, the calculation section 103 selects the predetermined filtering constant used in the filtering process for calculating the estimated radius-of-curvature R2 described in the first embodiment. When the process at step S204 is completed, the calculation section 103 advances the process to step S205.

At step S205, the calculation section 103 calculates an estimated radius-of-curvature by multiplying the selected filtering constant to each of the radius of curvature R used in the filtering processes, up to a radius of curvature R which is stored in the past preceding, by a predetermined number, the latest radius of curvature R stored the storage section which is not shown, and by adding the products of those. When the process at step S205 is completed, the calculation section 103 returns the process to step S201.

The above is the description of the processes of the calculation section 103 according to the second embodiment. By conducting the processes shown in the flowchart in FIG. 6, the calculation section 103 can, based on the calculated radius of curvature R, determine the type of the travel route in which the own-vehicle is traveling, and can accurately calculate and estimate the estimated radius-of-curvature by using the appropriate filtering constant used in the filtering process depending on the determined type of the travel route. The reasons why the high responsivity filtering process using the filtering constant for calculating the estimated radius-of-curvature R1 is suitable when traveling on a curve, and why the high stability filtering process using the filtering constant for calculating the estimated radius-of-curvature R2 is suitable when travel in a straight route, are reasons similar to those described in the first embodiment. Furthermore, also with the travel route estimation device 1 according to the second embodiment, since the estimated radius-of-curvature is calculated and estimated based on the rotational angular velocity and on the traveling velocity of the own-vehicle, even when the own-vehicle is traveling on a travel route that does not have any objects installed on the route, the radius of curvature of the travel route can be accurately estimated as one shape of the travel route.

Note that, in another one embodiment of the present invention, instead of the radius of curvature calculated based on the rotational angular velocity and on the traveling velocity of the own-vehicle, a radius of curvature calculated by a publicly known method based on a steering angle of a steering wheel resulting from steering of the own-vehicle by the driver and based on the rotational angular velocity and on the traveling velocity of the own-vehicle may be used. Furthermore, in another one embodiment of the present invention, instead of the radius of curvature R calculated by a publicly known method based on the rotational angular velocity and on the traveling velocity of the own-vehicle, a radius of curvature that is calculated based solely on the steering angle of the steering wheel resulting from steering of the own-vehicle by the driver may be used.

Furthermore, in another one embodiment of the present invention, a filtering process may be conducted, in which a weighted average is obtained as in the first embodiment but from three or more estimated radius-of-curvatures which are respectively calculated in filtering processes whose characteristics change between responsivity and stability.

Furthermore, in another one embodiment of the present invention, a single filtering constant may be selected as in the second embodiment but from among three or more filtering constants which are for conducting filtering processes in which the characteristics change between responsivity and stability, and the estimated radius-of-curvature KR may be calculated by conducting a filtering process using the selected filtering constant.

Furthermore, in another one embodiment of the present invention, any other filtering process may be used to calculate the estimated radius-of-curvature R1 and the estimated radius-of-curvature R2, as long as the characteristic can be changed between stability and responsivity by changing a filtering constant as described in the first embodiment.

Furthermore, in another one embodiment of the present invention, any other method may be used for the method to obtain the weighted average of the estimated radius-of-curvature R1 and the estimated radius-of-curvature R2, as long as estimated radius-of-curvature information representing an estimated radius-of-curvature which largely changes instantaneously can be prevented from being generated as described in the first embodiment, by generating, if the estimated radius-of-curvature R2 is selected when the estimated radius-of-curvature R1 has been selected or if the estimated radius-of-curvature R1 is selected when the estimated radius-of-curvature R2 has been selected, an estimated radius-of-curvature information that directly indicates the selected estimated radius-of-curvature as described in the first embodiment.

Furthermore, functions of the calculation section 103 may be realized by having an integrated circuit such as an LSI, a CPU, or a microcomputer to interpret and execute a predefined program data which enables execution of process steps stored in a storage device (ROM, RAM, hard disk, and the like). The integrated circuit may be an integrated circuit included in the above described ECU mounted on a movable body such as an automobile. Furthermore, in such case, the program data may be installed in the storage device via a storage medium, or may be directly executed from a storage medium. Here, the storage medium may be a semiconductor memory such as a ROM, a RAM, and a flash memory, a magnetic disc memory such as a flexible disk and a hard disk, an optical disk memory such as a CD-ROM, a DVD, and a BD, a memory card, and the like.

While the invention has been described in detail, the foregoing description is in all aspects illustrative and not restrictive. It is understood that all of the above described embodiments may be combined in any way, and that numerous other modifications and variations can be devised without departing from the scope of the present invention.

Industrial Applicability

The present invention allows to estimate a shape of a travel route in which one is traveling, and is useful as, for example, a travel route estimation device mounted on a movable body such as an automobile.

The invention claimed is:

1. A travel route estimation device comprising:
a displacement velocity detection unit which detects a displacement velocity of one's own-vehicle over a travel route surface;
a radius-of-curvature calculation unit which calculates, based on the displacement velocity, a plurality of radius of curvatures of a travel route of the own-vehicle;
a filtering process unit which conducts a filtering process on radius of curvatures up to a radius of curvature preceding a latest estimated radius of curvature by a predetermined number, among the plurality of radius of curvatures calculated by the radius-of-curvature calculation unit, and outputs a first radius of curvature and a second radius of curvature which is a value obtained at a same point as the first radius of curvature and has a lower responsivity to a change in the radius of curvature of the travel route of the own-vehicle than the first radius of curvature;
a weighted average unit which calculates, as a radius of curvature to be output to a safety apparatus of the own-vehicle, a third radius of curvature obtained by multiplying a first weight constant to the first radius of curvature and a second weight constant to the second radius of curvature and adding results of the multiplications, the first and second radius of curvatures being obtained at a same time point as a latest radius of curvature; and
a weight constant control unit which performs
a process of changing the first weight constant and the second weight constant when the travel route of the own-vehicle is determined as having changed from a straight route to a curve and every time the third radius of curvature is calculated, wherein the first weight constant is increased and the second weight constant is decreased compared to those at a last calculation of the third radius of curvature by the weighted average unit, and
a process of changing the first weight constant and the second weight constant when the travel route of the own-vehicle is determined as having changed from a curve to a straight route and every time the third radius of curvature is calculated, wherein the first weight constant is decreased and the second weight constant is increased compared to those at the last calculation of the third radius of curvature by the weighted average unit.

2. The travel route estimation device according to claim 1, wherein the filtering process unit includes:
a first filtering process unit which calculates the first radius of curvature, by multiplying filtering constants to the radius of curvatures that are up to the radius of curvature preceding the latest radius of curvature by the predetermined number among the plurality of radius of curvatures calculated by the radius-of-curvature calculation unit, such that the filtering constants are set to become sequentially larger by having a filtering constant for multiplying an oldest radius of curvature, of the radius of curvatures that are up to the radius of curvature preceding the latest radius of curvature by the predetermined number among the plurality of radius of curvatures, to be a smallest of the filtering constants and a filtering constant for multiplying a latest radius of curvature, of the radius of curvatures that are up to the radius of curvature preceding the latest radius of curvature by the predetermined number among the plurality of radius of curvatures, to be a largest of the filtering constants, and adding results of the multiplications; and
a second filtering process unit which calculates the second radius of curvature, by multiplying filtering constants to the radius of curvatures that are up to the radius of curvature preceding the latest radius of curvature by the predetermined number among the plurality of radius of curvatures calculated by the radius-of-curvature calculation unit, such that the filtering constants are set to become sequentially smaller by having a filtering constant for multiplying the oldest radius of curvature, of radius of curvatures that are up to the radius of curvature preceding the latest radius of curvature by the predetermined number among the plurality of radius of curvatures, to be the largest of the filtering constants and a filtering constant for multiplying a latest radius of curvature, radius of curvatures that are up to the radius of curvature preceding the latest radius of curvature by the predetermined number among the plurality of radius of curvatures, to be a smallest of the filtering constants, and adding results of the multiplications.

3. The travel route estimation device according to claim 2, wherein the weight constant control unit further includes
- a calculation unit which calculates an absolute value of a difference obtained by subtracting, from a rotational angular velocity of the own-vehicle above a travel route surface of the own-vehicle estimated based on the first radius of curvature, a rotational angular velocity of the own-vehicle above a travel route surface of the own-vehicle estimated based on the second radius of curvature;
- a first determination unit determines that the type of the travel route of the own-vehicle has changed from a straight route to a curve, if the first radius of curvature is less than a predetermined threshold and the absolute value is larger than a predetermined threshold; and
- a second determination unit determines that the type of the travel route of the own-vehicle has changed from a curve to a straight route, if the second radius of curvature is less than a predetermined threshold and the absolute value is larger than a predetermined threshold.

4. The travel route estimation device according to claim 1, wherein the displacement velocity detection unit detects, as the displacement velocity, both a traveling velocity of the own-vehicle and a rotational angular velocity of the own-vehicle over the travel route surface.

5. The travel route estimation device according to claim 1, further comprising a generation unit that generates, using the third radius of curvature as a prediction result of a travelling direction of the own-vehicle, information for a device that detects a possibility that the own-vehicle and another vehicle will collide.

6. The travel route estimation device according to claim 1, wherein the weight constant control unit:
- maintains, when the travel route of the own-vehicle is determined as having changed from a straight route to a curve, the first and second weight constants at fixed values after the third radius of curvature has become equal to the first radius of curvature until the travel route of the own-vehicle changes to a straight route; and
- maintains, when the travel route of the own-vehicle is determined as having changed from a curve to a straight route, the first and second weight constants at fixed values after the third radius of curvature has become equal to the second radius of curvature until the travel route of the own-vehicle changes to a curve.

7. A travel route estimation method implemented by a processor of a travel route estimation device, the method comprising:
- a displacement velocity detection step of detecting a displacement velocity of one's own-vehicle over a travel route surface;
- a radius-of-curvature calculation step of calculating, based on the displacement velocity, a plurality of radius of curvatures of a travel route of the own-vehicle;
- a filtering process step of conducting a filtering process on radius of curvatures up to a radius of curvature preceding a latest estimated radius of curvature by a predetermined number, among the plurality of radius of curvatures calculated by the radius-of-curvature calculation step, and outputting a first radius of curvature and a second radius of curvature which is a value obtained at a same point as the first radius of curvature and has a lower responsivity to a change in the radius of curvature of the travel route of the own-vehicle than the first radius of curvature;
- a weighted average step of calculating, as a radius of curvature to be output to a safety apparatus of the own-vehicle, a third radius of curvature obtained by multiplying a first weight constant to the first radius of curvature and a second weight constant to the second radius of curvature and adding results of the multiplications, the first and second radius of curvatures being obtained at a same time point as a latest radius of curvature; and
- a weight constant control step of performing
  - a process of changing the first weight constant and the second weight constant when the travel route of the own-vehicle is determined as having changed from a straight route to a curve and every time the third radius of curvature is calculated, wherein the first weight constant is increased and the second weight constant is decreased compared to those at a last calculation of the third radius of curvature by the weighted average step, and
  - a process of changing the first weight constant and the second weight constant when the travel route of the own-vehicle is determined as having changed from a curve to a straight route and every time the third radius of curvature is calculated, wherein the first weight constant is decreased and the second weight constant is increased compared to those at the last calculation of the third radius of curvature by the weighted average step.

8. The travel route estimation method according to claim 7, wherein the weight constant control step further includes:
- maintaining, when the travel route of the own-vehicle is determined as having changed from a straight route to a curve, the first and second weight constants at fixed values after the third radius of curvature has become equal to the first radius of curvature until the travel route of the own-vehicle changes to a straight route; and
- maintaining, when the travel route of the own-vehicle is determined as having changed from a curve to a straight route, the first and second weight constants at fixed values after the third radius of curvature has become equal to the second radius of curvature until the travel route of the own-vehicle changes to a curve.

\* \* \* \* \*